W. HARRIS, Sr.
PROCESS OF MANUFACTURING IRON AND STEEL.
No. 181,673.            Patented Aug. 29, 1876.
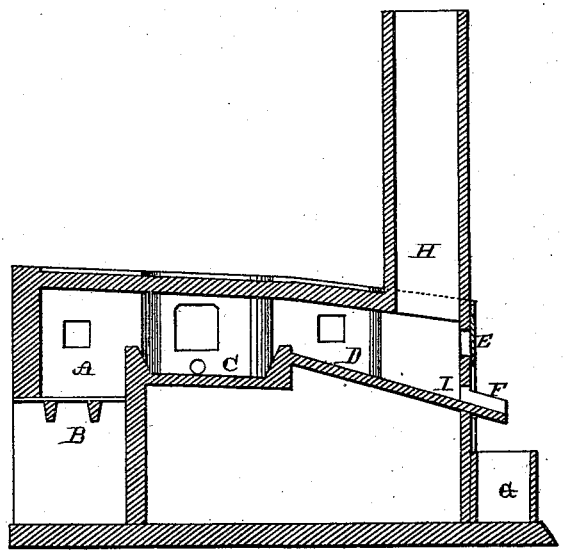
WITNESSES:
Wm. Garner
F. W. Burnham.
INVENTOR:
Wm. Harris, Sr.
her
F. A. Lehmann, Atty.

UNITED STATES PATENT OFFICE.

WILLIAM HARRIS, SR., OF READING, PENNSYLVANIA.

IMPROVEMENT IN PROCESSES OF MANUFACTURING IRON AND STEEL.

Specification forming part of Letters Patent No. 181,673, dated August 29, 1876; application filed June 3, 1876.

*To all whom it may concern:*

Be it known that I, WILLIAM HARRIS, Sr., of Reading, in the county of Berks and State of Pennsylvania, have invented certain new and useful Improvements in Process of Treating Iron; and I do hereby declare the following to be a full, clear, and exact description of the invention, such as will enable others skilled in the art to which it pertains to make and use it, reference being had to the accompanying drawings, which form part of this specification.

My invention consists in a process of converting cast-iron into wrought-iron by refining the same with pulverized magnetic-iron ore in a melted state, and subjecting it to a water-bath, and finally melting it with similar iron ore, as hereinafter more fully set forth.

In the annexed drawings, which fully illustrate my invention, A represents the furnace, with grate or fire-box B. C is the chamber where the refined iron is placed to be converted into wrought-iron or steel. D is an auxiliary chamber, arranged within the walls of the furnace, between the chamber C and the smoke-stack H. In this auxiliary chamber the cast-iron is placed to be refined. E is a door in the flue underneath the stack, and above the tapping-spout F, to make and keep the bottom of the chamber D in proper shape, and also to take out any refuse that may be left from the cast-iron in said chamber D. F is the spout through which the melted iron is tapped out from the chamber D into the water-tank G below.

The cast-iron is put into the chamber D with from two and a half to five per cent., more or less, of pulverized magnetic-iron ore, and melted in a liquid state, and as the iron melts it runs down into the receiver I, and is then tapped through the spout F into the tank G, which is filled with cold water, and chilled rapidly. When the iron is cool it is taken out of the tank G and placed in the chamber C, with from ten to twenty per cent., more or less, of pulverized magnetic-iron ore, and melted in a liquid state. It is then tapped out of the chamber C into cast-iron molds, with a certain proportion of pulverized magnetic-iron ore running into the cast-iron molds at the same time, to take up the balance of the carbon, and convert the melted iron into wrought-iron; or, by running the melted iron out of the chamber C into tanks filled with hot water, it is converted into wrought-iron balls.

To convert the iron into steel a certain proportion of spiegeleisen is added. When the iron is in a liquid state in the chamber C it can be rabbled and balled the same as the old way of puddling, but in considerably less time.

It will be seen that by my invention, at the same time as the refined iron is being converted into wrought-iron or steel in the chamber C, the cast-iron is being refined in the chamber D with the same fuel, as the flame or heat passes from the chamber C through the chamber D, and melts the cast-iron into a liquid state. As this iron melts and runs down into a receiver underneath the stack through the flame and heat, it loses part of its impurities. The balance of the impurities is taken out with the water-bath, and the iron is thus refined before going into the chamber C, when it is easily converted into wrought-iron or steel in less time than by the ordinary process of puddling.

Having thus fully described my invention, what I claim as new, and desire to secure by Letters Patent, is—

The process herein described for converting cast-iron into wrought-iron or steel, by first refining the same with pulverized magnetic-iron ore within a chamber, and, when in a melted state, subjecting it to a water-bath, and then, when cool, melting it in another chamber with similar iron ore, the two chambers and receiver being arranged in the same furnace, substantially as herein set forth.

In testimony that I claim the foregoing I have hereunto set my hand this 27th day of May, 1876.

WILLIAM HARRIS, SR.

Witnesses:
S. M. MEREDITH,
HENRY HARRIS.